F. FELBINGER.
METALLIC PACKING.
APPLICATION FILED MAY 23, 1910.
999,767.
Patented Aug. 8, 1911.
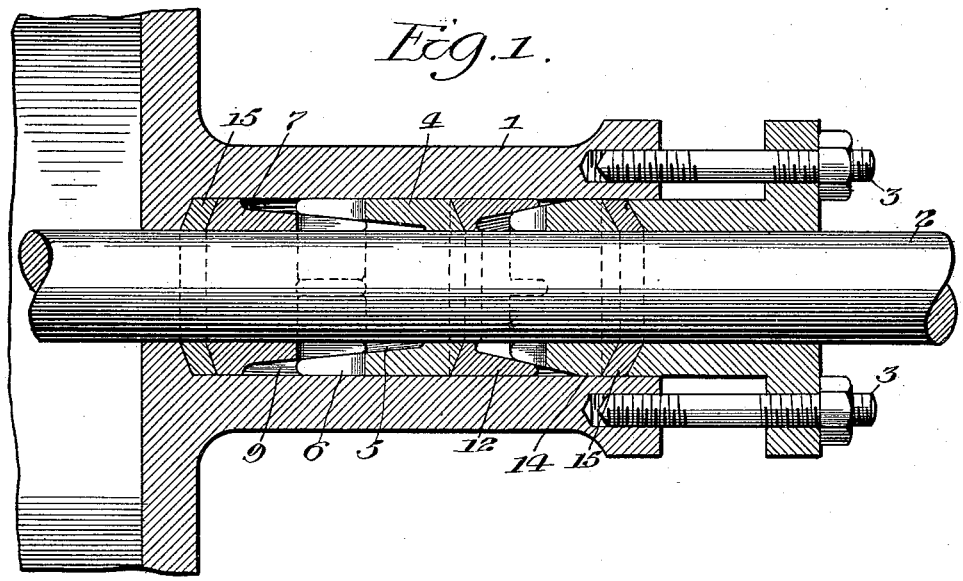
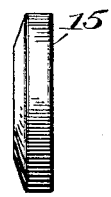
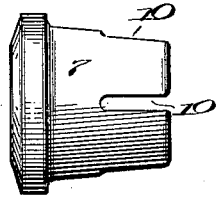
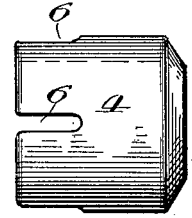
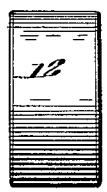
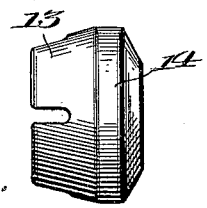

UNITED STATES PATENT OFFICE.

FRANK FELBINGER, OF MILWAUKEE, WISCONSIN.

METALLIC PACKING.

999,767. Specification of Letters Patent. Patented Aug. 8, 1911.

Application filed May 23, 1910. Serial No. 562,830.

*To all whom it may concern:*

Be it known that I, FRANK FELBINGER, a citizen of the United States, residing at the city of Milwaukee, in the county of Milwaukee and State of Wisconsin, have invented a new and useful Improvement in Metallic Packing, of which the following is a specification.

My invention relates to metallic stuffing box packings and is designed to provide a simple, cheap and effective means for packing stuffing boxes which can be readily adjusted to take up wear, in which abundant oil space is provided, and in which the friction is reduced to a minimum.

It is particularly intended for the control of extreme high pressures as in ice machines, and in practice will resist the highest fluid pressure to which it may be subjected without blowing out or becoming displaced.

The principles of my invention are illustrated in the drawings, in which—

Figure 1 shows a longitudinal section of a stuffing box provided with my improved packing; Figs. 2 and 3 represent two members, one of which is adapted to fit into the other, forming the packing device proper; Figs. 4 and 5 represent a collar and a packing device adapted to fit therein; Fig. 6 is a washer which may be used for further adjustment.

Further describing my invention with reference to the drawings, in which like characters of reference denote like parts throughout: 1 represents the wall of a stuffing box provided with the follower 2 and adjusting bolts 2' of the usual type.

3 is a piston rod or shaft passing through the stuffing box.

4 is an outer or collar member formed with substantially parallel exterior walls and of proper diameter to snugly fit within the stuffing box. The interior walls 5 are tapered as shown and provided with slots 6 at the thin edges thus formed.

7 is a member having substantially parallel interior walls adapted to fit the piston rod or shaft 2 and having the outer walls 9 tapered to fit within the correspondingly formed interior portion of the collar member 4. Like the other member it is provided with slots 10 and when placed in position the slots 6 should break joints with the slots 10.

The arrangement just described constitutes the primary feature of my invention, and in many cases this device without further addition will adapt itself to any ordinary stuffing box and piston rod, and is adapted to take up all wear thereof by proper adjustment of the follower 2. For very high pressures and to meet unusual conditions the devices may be duplicated in a properly elongated stuffing box, but I prefer instead of a simple duplication to use the device shown in Figs. 4 and 5, in which 12 is an unslotted collar, having its interior walls beveled and adapted to receive the wedge-shaped portion 13 of the member 14. The action of the two is similar to the first described device, except that the collar member is not expanded against the walls of the stuffing box, while the edges of the other portion of the device may be under pressure caused to bear upon the piston rod. I find in practice that this device works more smoothly and is less subject to heating than where the additional packing is provided by simple duplication of the parts first described.

When the parts of a stuffing box and piston rod to which this device is to be applied are worn out of truth, a dish-shaped washer 15 shown in Fig. 6 may be placed in the bottom of the stuffing box chamber, and also if desired at the base of the follower. This arrangement aids in causing an automatic adjustment of the parts and to cause them to close upon and follow the piston rod in its movements. It should be observed that when the parts shown in Figs. 2 and 3 are put together, the slots 6 and 10 should not be opposite each other, and it should further be said that the arrangement of slots described, together with the spaces formed beyond the thin edges of each member within its corresponding one, provide oil chambers which add materially in the lubrication of the piston rod.

I claim:

1. A stuffing box packing comprising two mutually related tubular members one end of each being of uniform thickness throughout its periphery and the other end of each having a thin edge provided with slots whereby, when said edges are telescoped, they are adapted respectively to contract and expand each other.

2. In combination with the walls of a stuffing box, its follower, and the rod or shaft passing therethrough, a plurality of mutually related tubular members one end of each being of uniform thickness throughout its periphery and the other end of each having a thin edge provided with slots whereby, when said edges are telescoped, the edges of said members will be respectively expanded and contracted to close the space between said box and shaft.

3. In a stuffing box packing having two mutually related tubular members each having a thin edge provided with slots whereby, when said edges are telescoped, they are adapted respectively to contract and expand each other, the combination therewith of two mutually related tubular members, the first or collar having a thin edge and the second having a thin edge provided with slots and adapted to be closed by the collar when telescoped therein.

4. In a stuffing box having a plurality of alined members adapted to telescope with each other and be expanded or contracted thereby, the combination therewith of a dished washer whereon the said members may be seated to preserve the alinement thereof.

In witness whereof, I have hereunto set my hand this 19th day of May A. D. 1910, in the presence of two subscribing witnesses.

FRANK FELBINGER.

Witnesses:
C. K. CHAMBERLAIN,
A. S. PHILLIPS.

Copies of this patent may be obtained for five cents each, by addressing the "Commissioner of Patents, Washington, D. C."